No. 623,356. Patented Apr. 18, 1899.
E. F. C. DANZER.
TRUCK BED OR BODY.
(Application filed Nov. 17, 1898.)
(No Model.)
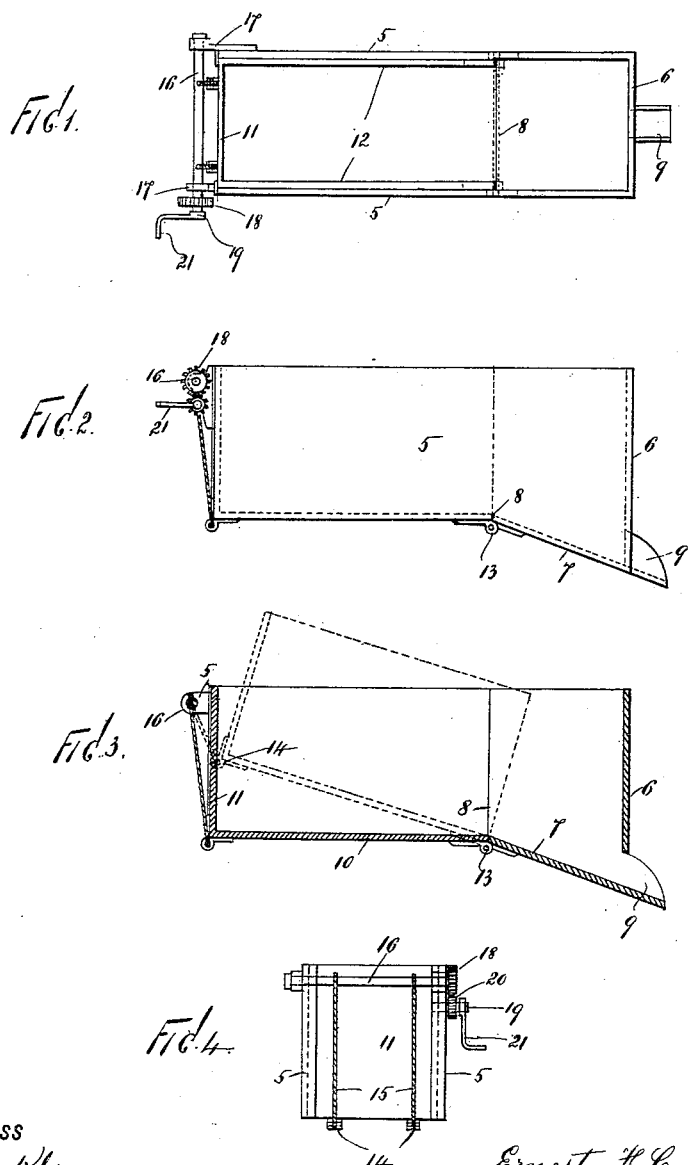
WITNESS
John Buckler,
F. A. Stewart
INVENTOR
Ernest F. C. Danzer,
BY
Edgar Tate
ATTORNEYS

UNITED STATES PATENT OFFICE.

ERNEST F. C. DANZER, OF NEW YORK, N. Y.

TRUCK BED OR BODY.

SPECIFICATION forming part of Letters Patent No. 623,356, dated April 18, 1899.

Application filed November 17, 1898. Serial No. 696,662. (No model.)

*To all whom it may concern:*

Be it known that I, ERNEST FREDERICK CHRISTAIN DANZER, a citizen of the United States, residing at New York, (Brooklyn,) in the county of Kings and State of New York, have invented certain new and useful Improvements in Truck Beds or Bodies, of which the following is a full and complete specification, such as will enable those skilled in the art to which it appertains to make and use the same.

This invention relates to trucks such as are usually employed by coal-dealers for delivering coal, and particularly to the beds or bodies of trucks of this class; and the object of the invention is to provide a bed or body for a truck of the class referred to which is of novel construction and provided with improved means for dumping the coal.

The invention is fully disclosed in the following specification, of which the accompanying drawings form a part, in which—

Figure 1 is a plan view of the bed or body of a truck made according to my invention; Fig. 2, a side view thereof; Fig. 3, a sectional side view showing the main portion of the truck bed or body in longitudinal section, and Fig. 4 a front end view of said bed or body.

In the drawings forming part of this specification the separate parts of my improvement are designated by the same numerals of reference in each of the views, and in the practice of my invention I provide a main truck bed or body comprising sides 5, a rear end 6, and a partial bottom 7. The main truck bed or body has no front end, or, rather, is open at the front end, and the bottom thereof for about two-thirds of its length or back to the point 8 is also open, and the bottom 7 of the rear end of the main truck bed or body is downwardly inclined from the point 8, as clearly shown in the drawings, and said truck bed or body is also provided at the bottom of the rear end and centrally thereof with the usual discharge-spout 9. The main truck bed or body is also provided with a supplemental member comprising a bottom 10, a front end 11, and sides 12, and said supplemental member is hinged to the main truck bed or body at 13, and the rear end thereof is open, and said supplemental member or part of the main truck bed or body fits within the sides of the forward portion of said main truck bed or body, as clearly shown in the drawings.

Connected with the bottom of the front end of the supplemental part or member of the main truck bed or body are brackets 14, with which are connected cables or similar devices 15, which are also connected with a shaft 16, mounted in brackets 17, secured to the upper front portion of the sides 5 of the main truck bed or body, and said shaft is provided at one end with a gear-wheel 18, and below said gear-wheel is supported a short shaft 19, provided with a pinion 20, which operates in connection with the gear-wheel 18 and with a crank 21. The normal position of the pivotal part or member of the truck bed or body when the said truck bed or body is to be filled with coal is that shown in Figs. 1 and 2, in which it rests within the sides 5 of the main truck bed or body and constitutes the front end or receptacle for the coal. When it is desired to empty or dump the coal, the shaft 19 is operated by the crank 21, so as to turn the gear-wheel 18 and the shaft 16 on which said gear-wheel is mounted. This operation winds the chains or cables 15 on said shaft and raises the front end of the supplemental part or member of the truck bed or body into the position shown in Fig. 3, and the coal therein will be dumped through the discharge-spout 9, as will be readily understood. The raising of the supplemental part or member of the truck bed or body, as shown in Fig. 3 and above described, raises the bottom thereof until it is practically in line with the bottom 7 of the rear portion of the main truck bed or body and causes the coal to slide out through the discharge-spout 9, as will be readily understood.

In practice the main truck bed or body is mounted on a vehicle in the usual or any preferred manner and is stationary, and all that is necessary in order to dump the coal is to raise the front end of the supplemental part or member of the truck bed or body, as herein shown and described.

By means of my improvement I avoid the necessity of raising the front end of the main truck bed or body, as is now usually the custom, and it will be apparent that the operation of raising only the front end of the supplemental part or member of the main truck bed or body may be much more easily accomplished than by raising the entire truck bed or body. I thus accomplish the object of my invention by means of a device simple in construction and operation and also comparatively inexpensive.

It will be apparent that many changes in and modifications of the construction herein described may be made without departing from the spirit of my invention or sacrificing its advantages, and I reserve the right to make all such alterations therein and modifications thereof as fairly come within the scope of my invention.

Having fully described my invention, I claim as new and desire to secure by Letters Patent—

1. A truck bed or body comprising main and supplemental parts or members, one of which is placed within the other, the outer main member being longer than the inner supplemental member, and provided with a downwardly-inclined bottom portion at its rear end, and the front end and bottom of the main member being open, said supplemental part or member being closed at the sides, front and bottom, and open at the rear end and hinged to the main member at the inner end of the downwardly-inclined bottom thereof, substantially as shown and described.

2. A truck bed or body, comprising a main outer and a supplemental inner part or member, the main outer member being longer than the supplemental part or member, and provided with a downwardly-inclined bottom, and the supplemental inner member being closed at the front end, bottom and sides, and the rear end thereof being open, and hinged to the main outer member at the point where the downwardly-inclined bottom thereof begins, substantially as shown and described.

3. A truck bed or body, comprising a main outer and a supplemental inner part or member, the main outer member being longer than the supplemental part or member, and provided with a downwardly-inclined bottom, and the supplemental inner member being closed at the front end, bottom and sides, and the rear end thereof being open, and hinged to the main outer member at the point where the downwardly-inclined bottom thereof begins, and means for raising the front end of the supplemental inner member, substantially as shown and described.

4. A truck bed or body, comprising a main outer and a supplemental inner part or member, the main outer member being longer than the supplemental part or member, and provided with a downwardly-inclined bottom and the supplemental inner member being closed at the front end, bottom and sides, and the rear end thereof being open and hinged to the main outer member at the point where the downwardly-inclined bottom thereof begins, and means for raising the front end of the supplemental inner member, consisting of a shaft supported transversely of the front end of the main outer member at the top thereof, cables connected with the bottom of the front end of the supplemental inner member, and with said shaft, and means for operating said shaft and winding said cables thereon, substantially as shown and described.

5. A truck bed or body comprising a main portion and a supplemental portion, the main portion being longer than the supplemental portion and the bottom of the rear end thereof being inclined downwardly, said supplemental portion being mounted in the front end of the main portion and comprising a bottom, front, end and sides, said supplemental portion being hinged to the main portion at the front end of the downwardly-inclined bottom portion of the latter, and means for raising the front end of the supplemental portion, substantially as shown and described.

In testimony that I claim the foregoing as my invention I have signed my name, in presence of the subscribing witnesses, this 15th day of November, 1898.

ERNEST F. C. DANZER.

Witnesses:
   F. A. STEWART,
   C. C. OLSEN.